(12) United States Patent
Meyer et al.

(10) Patent No.: US 11,958,347 B2
(45) Date of Patent: Apr. 16, 2024

(54) ELECTRIC VEHICLE

(71) Applicant: FLET GMBH, Braunschweig (DE)

(72) Inventors: Wolfgang Meyer, Braunschweig (DE); Jochen Grote, Braunschweig (DE)

(73) Assignee: FLET GMBH, Braunschweig (DE)

( * ) Notice: Subject to any disclaimer, the term of this patent is extended or adjusted under 35 U.S.C. 154(b) by 885 days.

(21) Appl. No.: 16/980,053

(22) PCT Filed: Mar. 12, 2019

(86) PCT No.: PCT/EP2019/056159
§ 371 (c)(1),
(2) Date: Dec. 22, 2020

(87) PCT Pub. No.: WO2019/175170
PCT Pub. Date: Sep. 19, 2019

(65) Prior Publication Data
US 2021/0114448 A1 Apr. 22, 2021

(30) Foreign Application Priority Data
Mar. 13, 2018 (EP) .................................. 18161618

(51) Int. Cl.
*B60K 1/02* (2006.01)
*B60K 17/22* (2006.01)
(Continued)

(52) U.S. Cl.
CPC ................ *B60K 1/02* (2013.01); *B60K 17/22* (2013.01); *H02K 5/04* (2013.01); *H02K 5/203* (2021.01);
(Continued)

(58) Field of Classification Search
CPC .... B60K 1/02; B60K 17/22; B60K 2001/006; H02K 5/203; H02K 5/04; H02K 7/003; H02K 7/08; H02K 9/197; H02K 16/00
See application file for complete search history.

(56) References Cited

U.S. PATENT DOCUMENTS 6,160,332 A 12/2000 Tsuruhara
7,112,905 B2 * 9/2006 Chang .................... H02K 7/003
403/DIG. 7

(Continued)

FOREIGN PATENT DOCUMENTS

CN 201113708 9/2008
CN 204376659 6/2015
(Continued)

*Primary Examiner* — John D Walters
(74) *Attorney, Agent, or Firm* — WCF IP

(57) ABSTRACT

The invention relates to an electric vehicle (10) with an electric motor (18) wherein the electric motor (18) comprises (a) a first electric motor module (38.1) that features a first rotor (42.1) with a first rotor shaft (40.1) and whose rotor shaft (40.1) has a first shaft coupling structure (46*a*), and (b) at least a second electric motor module (38.2) that features a second rotor (42.2) with a second rotor shaft (40.2) and whose second rotor shaft (40.2) has a second shaft coupling structure (46*b*), and (c) a rotational bearing (68) by means of which the first rotor shaft (40.1) is mounted, wherein (d) the first rotor shaft (40.1) and the second rotor shaft (40.2) are positively coupled with one another by means of the shaft coupling structures (46). According to the invention, the shaft coupling structures (46) are at least partially surrounded by the rotational bearing (68).

19 Claims, 12 Drawing Sheets

Figure 1A:
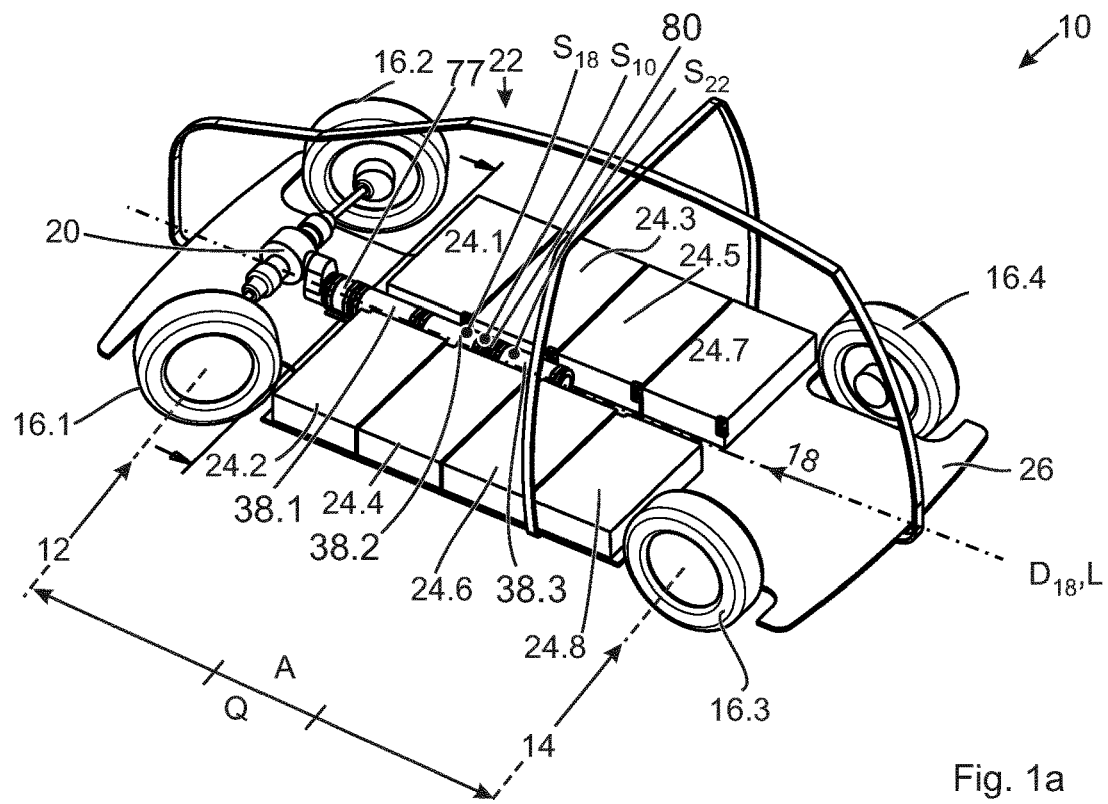

(51) Int. Cl.
  *H02K 5/04* (2006.01)
  *H02K 5/20* (2006.01)
  *H02K 7/00* (2006.01)
  *H02K 7/08* (2006.01)
  *H02K 9/197* (2006.01)
  *H02K 16/00* (2006.01)
  *B60K 1/00* (2006.01)

(52) U.S. Cl.
  CPC ............... *H02K 7/003* (2013.01); *H02K 7/08* (2013.01); *H02K 9/197* (2013.01); *H02K 16/00* (2013.01); *B60K 2001/006* (2013.01)

(56) References Cited

U.S. PATENT DOCUMENTS

| | | | |
|---|---|---|---|
| 9,236,787 B2 * | 1/2016 | Hattori | H02K 5/04 |
| 10,363,813 B2 * | 7/2019 | Richter | H02K 7/14 |
| 2004/0247383 A1 | 12/2004 | Chang et al. | |
| 2014/0028125 A1 | 1/2014 | Arai | |
| 2014/0035415 A1 | 2/2014 | Hattori | |
| 2014/0054993 A1 | 2/2014 | Hallundbaek | |
| 2018/0037108 A1 | 2/2018 | Richter et al. | |

FOREIGN PATENT DOCUMENTS

| | | |
|---|---|---|
| CN | 207069850 | 3/2018 |
| CN | 207069852 U | 3/2018 |
| DE | 2418242 | 10/1975 |
| DE | 10359159 | 7/2005 |
| EP | 0273482 | 7/1988 |
| EP | 2 573 906 | 3/2013 |
| EP | 3171496 | 5/2017 |
| GB | 1 496 223 | 12/1977 |
| JP | S5666169 | 6/1981 |
| JP | S58131163 | 8/1983 |
| JP | H048908 | 1/1992 |
| JP | H09163680 | 6/1997 |
| JP | H1127881 | 1/1999 |
| JP | H11266566 A | 9/1999 |
| JP | 2001-190047 A | 7/2001 |
| JP | 2001190047 | 7/2001 |
| JP | 3788861 | 6/2006 |
| JP | 2009291031 | 12/2009 |
| JP | 2010142090 A | 6/2010 |
| JP | 2010220340 | 9/2010 |
| JP | 5239814 | 7/2013 |
| JP | 5239814 B2 | 7/2013 |
| JP | 2014093816 | 5/2014 |
| WO | 95/01883 | 1/1995 |
| WO | 95/34117 | 12/1995 |
| WO | 01/52386 | 7/2001 |
| WO | 2005/053136 | 6/2005 |
| WO | 2012/146731 | 11/2012 |
| WO | 2014/015209 | 1/2014 |

* cited by examiner

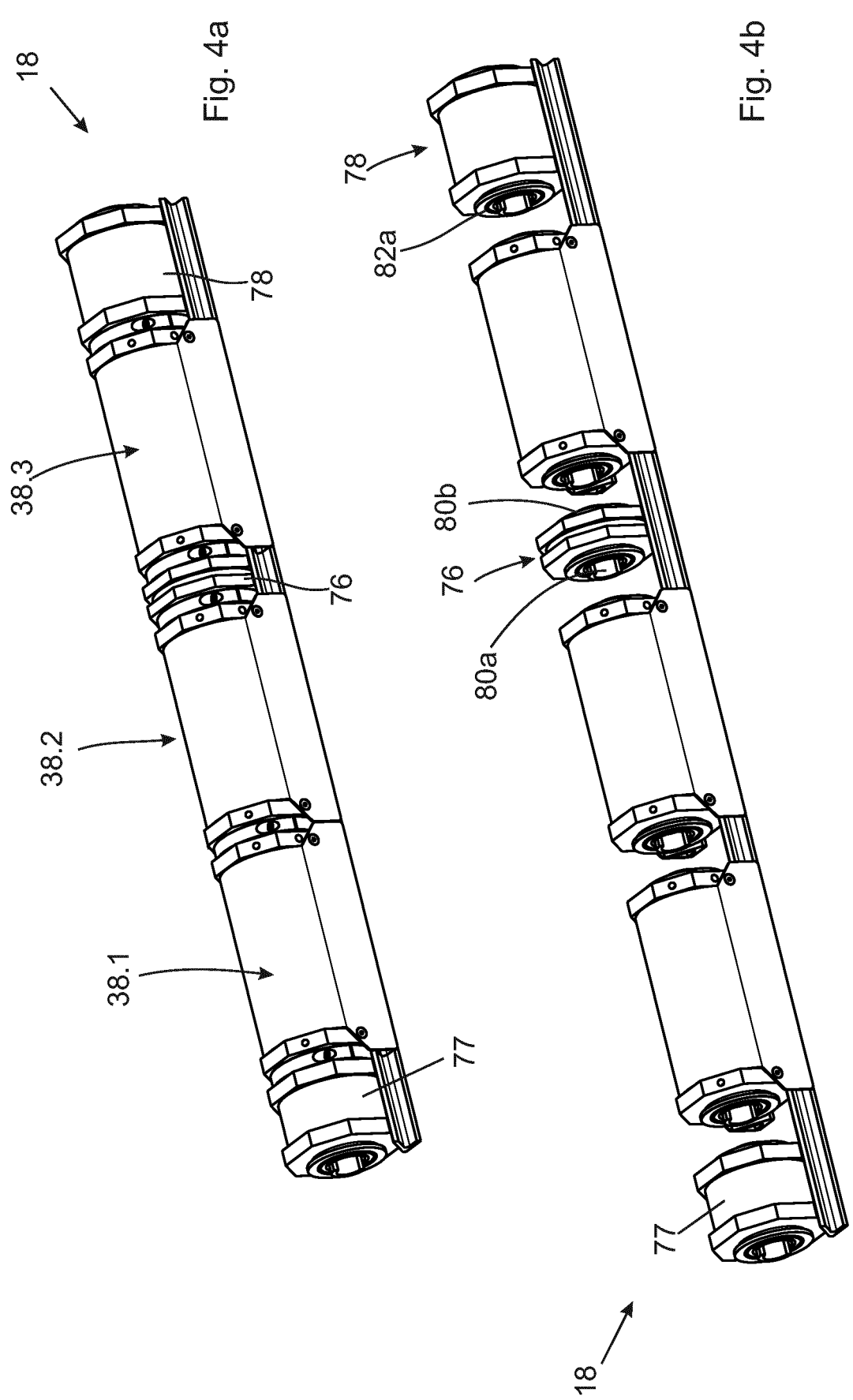

ELECTRIC VEHICLE

The invention relates to an electric vehicle with an electric motor in the form of a permanently excited synchronous motor comprising (a) a first electric motor module that features a first rotor with a first rotor shaft and whose rotor shaft has a first shaft coupling structure, and (b) at least a second electric motor module that features a second rotor with a second rotor shaft and whose second rotor shaft has a second shaft coupling structure, and (c) a rotational bearing by means of which the first rotor shaft is mounted, wherein (d) the first rotor shaft and the second rotor shaft are positively coupled with one another by means of the coupling structures. The invention also relates to an electric motor with the specified properties which is specifically designed for an electric vehicle, but this is not essential.

The invention also relates to an electric vehicle with an electric motor that has (a) a stator comprising stator electromagnets and (b) a rotor with permanent magnets.

In its most general form, the invention relates to an electric vehicle with an electric motor which may be, but does not have to be, a permanently excited synchronous motor; in particular, the electric motor may be an asynchronous motor. In this case, the rotor may feature permanent magnets; however, this is not a necessity.

Electric vehicles, in particular passenger vehicles, are increasingly used to transport people and goods. The mass production of electric vehicles has proven complex when different degrees of motor performance are to be offered in a single vehicle model.

The invention aims to reduce disadvantages of the prior art.

The invention solves the problem by way of an electric vehicle or electric motor according to the preamble of claim 1 where coupling structures are surrounded at least partially by the rotational bearing.

An advantage of the invention is that the electric motor can thus be built to be very compact. According to a preferred embodiment, it is therefore possible that the connection by means of the coupling structures on the housing and the rotor shafts does not lead to any additional axial extension of the structural length.

It is also an advantage that such a coupling structure is generally relatively simple to produce. It is therefore possible to construct the electric motor from two, three, four, five or more electric motor modules. As is the case with every modular design, the modularisation of the individual components generally leads to a more efficient production. The number of electric motor modules is preferably lower than twenty.

According to a preferred embodiment, each rotor of each electric motor module is mounted by means of two pivot bearings, such that the electric motor modules can function independently of one another. In other words, the rotor of each electric motor module is thus also mounted by means of pivot bearings when the electric motor modules are not connected to one another.

The pivot bearings are preferably rolling bearings.

Preferably, at least two electric motor modules are permanently excited synchronous motors. It is beneficial if all electric motor modules are permanently excited synchronous motors.

A nominal output of at least two electric motor modules preferably lies between 25 and 75 kilowatt.

The shaft coupling structures are preferably arranged at the same axial height as the rotational bearing.

The rotor shafts of the electric motor modules extend collinearly (in the mounted state).

According to a preferred embodiment, the rotational bearing has a first pivot bearing comprising a first set of rolling elements that are arranged annularly, and a second pivot bearing comprising a second set of rolling elements that are arranged annularly and at an offset to the first set. In this case, the shaft coupling structures are at least partially, but especially preferably completely, surrounded by the first pivot bearing and the second pivot bearing. The first pivot bearing and/or the second pivot bearing is, for example, a rolling bearing, specifically a ball bearing.

The advantage of this embodiment is that the coupling structures of each individual electric motor module are supported on both sides by at least one rolling bearing. To join two electric motor modules, the two coupling structures of the respective electric motor modules must simply be positively connected to one another.

In this arrangement, it is beneficial if the outermost pivot bearings of the electric motor modules are adjacent to each other. This results in a particularly compact electric motor. Due to the fact that the electric motor can be modularised, it is well-suited for use in vehicles, especially passenger vehicles. However, this electric motor can also be used in other vehicles as well as in other fields.

Preferably, the first shaft coupling structure features a coupling structure, in particular a projection, that extends in the axial direction. Preferably, the first shaft coupling structure thus features a projection that extends in the axial direction. The second shaft coupling structure preferably has a recess that also extends in the axial direction, so that the first shaft coupling structure and the second coupling structure abut one another in the axial direction along a contact surface. It is beneficial if the contact surfaces form an angle of at most 5° with respect to an angle measuring plane, which contains a rotational axis of the rotor. This reduces axial forces which would otherwise arise upon the application of a torque to the connection of the electro motor modules.

It is possible that the projection and the recess are designed to be asymmetrical. In this case, a first contact surface, along which the projection and the recess abut one another, extends at a different angle relative to the angle measurement plane than the second contact surface. In particular, it is possible that one of the angles is zero. In this case, no axial forces arise when the rotors rotate in a first direction. Conversely, a greater force arises when the rotors rotate in the opposite direction.

Preferably, the electric motor comprises at least one additional component, which has an additional component coupling structure with a projection extending in the axial direction, wherein the additional component is positively connected to one of the coupling structures of an electric motor module. Since the additional component has the same coupling structure as the electric motor modules, it can be placed between two electric motor modules as required. The additional component may be a rotary encoder, for example.

In this case, the electric motor accordingly comprises a rotary encoder, which has a rotary encoder coupling structure with a projection extending in the axial direction, wherein the rotary encoder is positively connected to one of the coupling structures of an electric motor module. Since the rotary encoder has the same coupling structure as the electric motor modules, it can be placed between two electric motor modules as required.

It should be noted that the rotary shafts of preferably all electric motor modules comprise coupling structures that can be positively coupled with one another.

Alternatively or additionally, the additional component is a brake. According to this embodiment, the electric motor has a brake, which has a brake coupling structure with a projection extending in the axial direction, wherein the brake is positively connected to a coupling structure of an electric motor module or the rotary encoder.

Alternatively or additionally, the additional component is a clutch.

A second aspect of the invention relates to an electric motor that comprises a stator, which features stator electromagnets, and a rotor, which features permanent magnets, wherein the rotor shaft has a cooling duct. An electric vehicle with a corresponding electric motor is also in line with the invention. In other words, an electric vehicle with an electric motor that comprises (a) a stator, which features stator electromagnets, and (b) a rotor, which features permanent magnets, wherein (c) the first rotary shaft and the second rotary shaft have a cooling duct, is in line with the invention. It is possible, but not essential, for this electric vehicle to exhibit the properties according to claim 1. The above-mentioned preferred embodiments are also preferred embodiments of the invention specified in this paragraph. Preferred embodiments given in the following refer to both inventions.

It is beneficial if this electric motor is composed of a first electric motor module and a second electric motor module, wherein the electric motor module features the properties specified above. The first rotor shaft and the second rotor shaft are positively coupled with one another by means of the shaft coupling structures, wherein the cooling duct preferably extends through the first rotor and the second rotor. It is also beneficial if the coupling structures are at least partially surrounded by the rotational bearing. This results in an electric motor with a modular design and cooled rotors.

It is beneficial if the rotor shaft has a central cooling duct that extends in the axial direction, a feed branch duct that extends radially outwards and is connected to the central cooling duct, and a discharge branch duct that extends outwards and is connected to the central cooling duct. It is thereby possible to supply the stator with cooling fluid through the feed branch duct. The stator preferably comprises a cooling fluid feed for supplying cooling fluid, in particular a liquid coolant, to the feed branch duct, and a cooling fluid discharge for discharging cooling fluid from the discharge branch duct.

It is especially preferable if the cooling fluid feed has a first shaft seal and a second shaft seal, which form an annular duct. The cooling fluid feed preferably also has a feed line that is designed to feed cooling fluid to the annular duct. The annular duct is arranged in such a way that the cooling fluid flows into the feed branch duct. In other words, the feed branch duct is arranged on an axial length along a longitudinal axis of the rotor between the first shaft seal and the second shaft seal.

It is beneficial if both electric motor modules are structurally identical. If there are more than two electric motor modules, preferably a majority of the electric motor modules, but especially preferably all electric motor modules, are structurally identical. The property that the electric motor modules are structurally identical should be understood particularly to mean that the electric motor modules consist at least 90 percent by weight of identical parts. In particular, preferably at least 95 percent by weight, but in particular the entire percent by weight, of the functionally relevant parts of at least two of the electric motor modules are the same. It is possible, but not essential, that the electric motor modules differ in the parts that are irrelevant to their function, for instance in colour or, of course, in any kind of label with a series number. It is especially preferable if all electric motor modules are structurally identical.

Preferably, at least the motor of one of the electric motor modules has a magnet carrier and a plurality of permanent magnets fixed to the magnet carrier. It is beneficial if the rotor features a secondary duct, which extends at least also in the axial direction through the magnet carrier and is connected to the central cooling duct. This allows the magnet carrier to be cooled effectively.

Permanent magnets lose their magnetisation above the Curie temperature. Since electric motors, especially the kind installed in electric vehicles, also have to function in comparatively warm environments and, in addition, a heating of the permanent magnets and the magnet carrier is inevitable, especially due to eddy-current losses, it must be ensured that the permanent magnets do not heat up too much. To date, this has been achieved by recording the temperature and switching off the corresponding motor if a predetermined threshold temperature, which is below the Curie temperature of the permanent magnets, has been exceeded. The cooling of the magnet carrier means that this procedure is still possible and preferable, but no longer essential.

It is especially beneficial if the permanent magnets are arranged radially outwards of the stator electromagnets. The electric motor can then be described as an external rotor. It is then especially beneficial if the rotor shaft has a first sleeve section, which extends in a first axial direction, and a second sleeve section, which extends in an opposite direction to the first axial direction, wherein the sleeve sections are preferably symmetrical and preferably contain cooling ducts. These cooling ducts are preferably connected to the cooling duct, in particular the central cooling duct. The active cooling of the sleeve sections enables the electric motor to be run with a high continuous output.

The sleeve sections are preferably designed on a tubular component that is fixed to a web. The web preferably has a connection duct that extends radially outwards which connects the central cooling duct to an external duct in the tubular component. The specified design means that the sleeve sections with the ducts are relatively easy to produce.

It should be noted that here, as throughout the entire description, the property that a particular object is provided should be understood to mean that at least one of these objects is provided. In the present context, this means that the web has at least one connection duct that extends radially outwards.

It is beneficial if the stator features a cooling nozzle, which is arranged to cool the electromagnets. Most of the heat loss occurs in the electromagnets. At the same time, electromagnets are generally less susceptible to temperature than permanent magnets. It is therefore possible that the cooling fluid is guided in a cooling circuit and first cools the permanent magnets, in particular the magnet carrier, and then the stator electromagnets in the direction of flow behind a cooler. Alternatively, it is also possible that there are two cooling circuits, wherein one cooling circuit cools the permanent magnets and a second cooling circuit cools the electromagnets.

It is beneficial if the electric motor as described above consists of at least two electric motor modules, wherein the motors of the respective electric motor modules each have a cooling duct and wherein both cooling ducts are connected to one another, so that cooling fluid can flow from the first cooling duct into the second cooling duct.

The first electric motor module preferably has a first module housing that comprises a first housing coupling structure, wherein the second electric motor module has a second module housing that comprises a second housing coupling structure and wherein the electric motor modules are positively connected to one another via their housing coupling structure. This constitutes a particularly simple form of the coupling of the electric motor modules.

The housing coupling structures can preferably be connected such that they can be disconnected from the outside. In other words, two coupled electric motor modules can be connected and disconnected from each other from the outside, without necessarily having to connect or disconnect further electric motor modules.

It is especially beneficial if each of the housing coupling structures is at least partially formed by a tapered housing ring. It is beneficial if the electric motor module features a connector for positively connecting the housing coupling structures to one another. The connector is preferably designed so it can be installed from the outside. In other words, the electric motor modules can be separated from one another simply by disconnecting the connector. The connector can be installed from the outside.

Preferably, the connector is a clamp, so that the housing coupling structures are connected to one another by means of the clamp. The clamp preferably has an at least partially tapered inner surface, wherein the tapered inner surface is generally designed in such a way that no linear contact occurs, but rather a surface contact between the housing rings on one side and the clamp on the other.

Preferably, the first rotor shaft and the second rotor shaft as well as, where applicable, further components of the electric motor that are coupled via the shaft coupling structures are coupled with axial play. Changes in axial length on the rotors via production tolerances or changes in length due to thermal causes during operation are offset by a defined axial play in the shaft coupling structure.

In the following, the invention will be explained in more detail by way of the attached figures. All figures show the invention on one of several types of electric motor, namely as permanently excited synchronous motors, which are a preferred embodiment of the invention. However, other types of electric motor can be used, such as asynchronous motors or brushless direct current motors. What is shown in the drawings is in FIG. 1a an electric vehicle according to the invention with an electric motor according to the invention, FIG. 1b an electric vehicle according to the invention in a view from behind, FIG. 1c an electric vehicle according to a second embodiment with two clutches and two driven axles in a perspective view, FIG. 1d an electric vehicle according to a third embodiment with two electric motors according to the invention, whose rotors extend parallel to one another, with four clutches in a perspective view, FIG. 2a a scaled perspective view of an electric motor module, which is designed as an internal rotor and may form part of an electric motor according to the invention, FIG. 2b the rotor of the electric motor module of the internal rotor version according to FIG. 2a in a perspective view, FIG. 3a a cross-section through an electric motor according to the invention in the form of an internal rotor from two electric motor modules according to FIGS. 2a and 2b, FIG. 3b a detailed view of the electric motor module according to FIG. 3a, FIG. 4 in the partial FIG. 4a, a perspective, scaled view of an electric motor according to the invention according to a fourth embodiment, which comprises electric motor modules, and in the partial FIG. 4b, a partially exploded view of the electric motor according to partial FIG. 4a, FIG. 5 a cross-section through an electric motor module, which represents an electric motor in the form of an internal rotor, FIG. 6 a cross-section through an electric motor module of an electric motor according to the invention or an electric motor according to the invention that represents an internal rotor electric motor, FIG. 7 in the partial FIG. 7a, the rotor of the electric motor module according to FIG. 6 in an isometric perspective view and in partial FIG. 7b, a rotor shaft and a web of the rotor according to partial FIG. 7a, FIG. 8 a cross-section through an electric motor according to the invention with two electric motor modules that are designed as internal rotor electric motors, FIG. 9 in the partial FIG. 9a, a cooling nozzle for an electric motor according to the invention in an isometric perspective glass body view, and FIG. 9b a cross-section through the stator cap 50 of the cooling nozzle according to partial FIG. 9b, and in FIG. 10 a further embodiment of an electric motor module 38.

FIG. 1a depicts an electric vehicle 10 according to the invention in the form of an electric car, which comprises a first axle 12 in the form of a front axle and a second axle 14 in the form of a rear axle. Wheels 16.1, 16.2 are fixed to the first axle 12; wheels 16.3, 16.4 are fixed to the second axle 14. An electric motor 18 drives the wheels 16.1, 16.2 of the first axle 12 via a differential gearbox 20, which may also be referred to as a differential.

The electric motor 18 is supplied with power from a battery 22. The battery 22 comprises at least two—in the present case eight—battery units 24.1, 24.2, ..., 24.8. The term battery should be understood here to mean any kind of unit of galvanic elements that serves to store electrical energy or convert into electrical energy to supply the electric motor 18.

It is clear to see that a motor rotational axis $D_{18}$ extends between the battery units 24.1, 24.3, 24.5, 24.7 on one side and 24.2, 24.4, 24.6 and 24.8 on the other. A mass $m_r$ of the battery units 24.1, 24.3, 24.5 and 24.7 arranged to the right of the motor rotational axis $D_{18}$ corresponds to a mass $m_l$ of the battery elements to the left of the motor rotational axis $D_{18}$, i.e. in the present case of the battery elements 24.2, 24.4, 24.6 and 24.8.

The feature that the two masses $m_r$, $m_l$ correspond to each other should be understood particularly to mean that the two masses deviate from one another by a maximum of 20%, preferably a maximum of 15%.

The electric vehicle 10 has a vehicle floor 26. In the present embodiment, both the battery 22 and the electric motor 18 are mounted on the vehicle floor 26. The electric vehicle 10 also has components that are not depicted, such as an outer casing, in particular made of sheet metal, seats and a steering system.

Figure 1B:
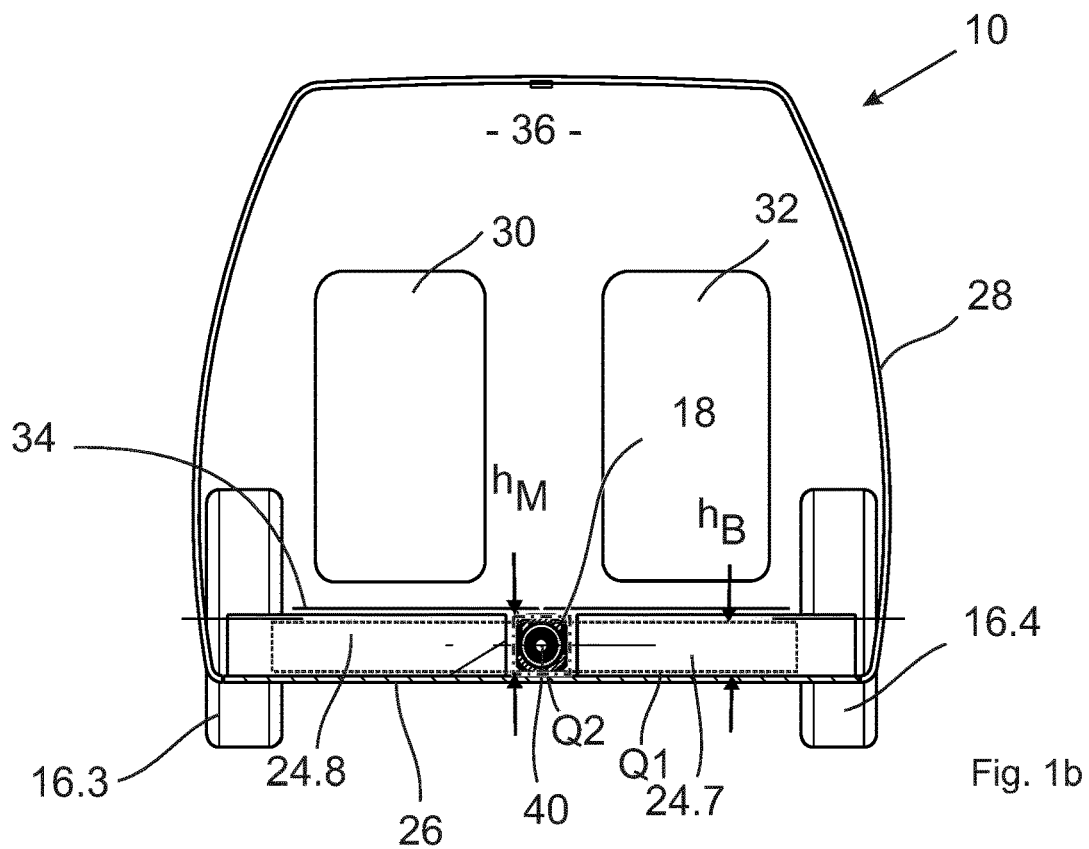

FIG. 1b shows the electric vehicle 10 in a view from behind. It should be recognised that an electric motor overall height $h_M$ corresponds to a battery overall height $h_B$. The electric motor overall height $h_M$ is the height of the conceived cuboid $Q_1$ of minimal volume, which encloses 90% of the mass of the battery 22. FIG. 1b also shows a body 28 of the electric vehicle 10. A driver's seat 30 and a front passenger's seat 32 are also depicted, both of which are arranged on an even floor 34 of a passenger area 36.

In the embodiment shown in FIG. 1*a*, the electric motor 18 is composed of three electric motor modules 38.1, 38.2, 38.3 that are coupled behind one another. All three electric motor modules 38.1, 38.2, 38.3 are structurally identical and comprise rotor shafts 40.1, 40.2, 40.3 that are coupled with one another. The electric motor modules 38.1 (i=1, . . . N; N: number of electric motor modules) are structurally identical.

Figure 1C:
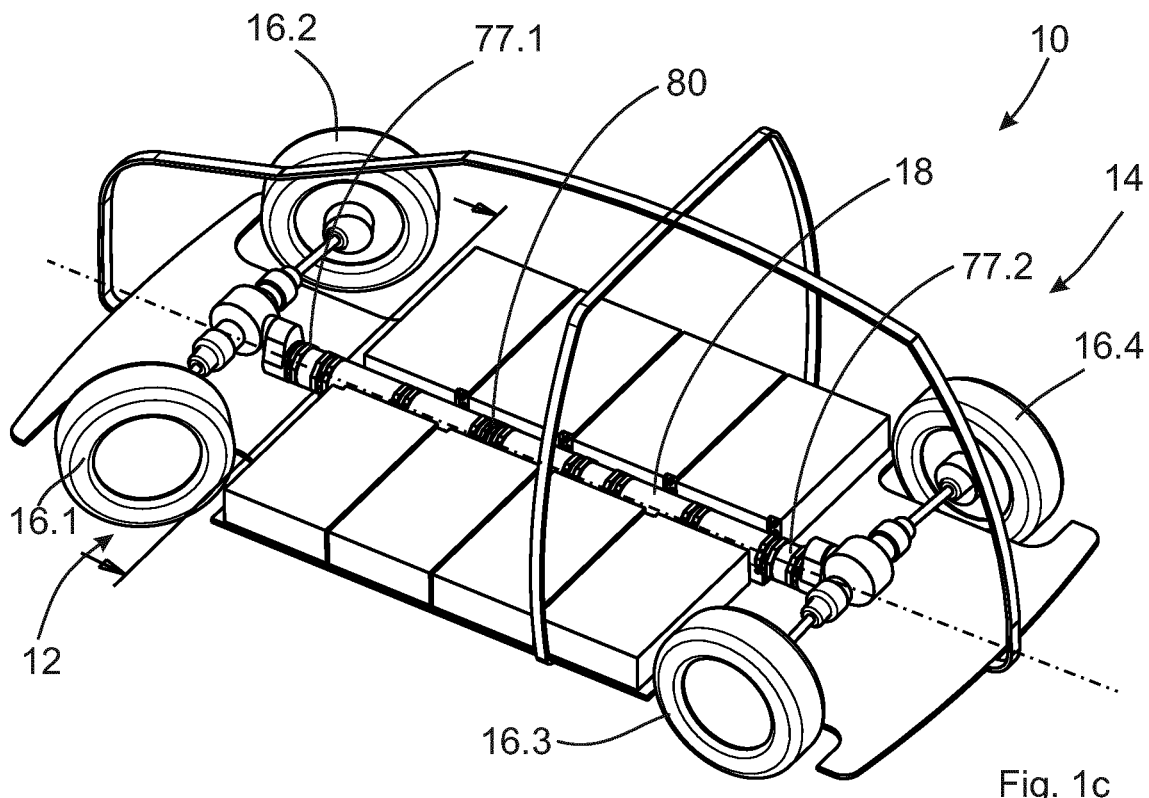

FIG. 1*c* shows a scaled perspective view of an electric vehicle 10 according to the invention without its vehicle body, comprising a first clutch 77.1 and a second clutch 77.2. The first clutch is located in a torque path between the electric motor 18 and the wheels 16.1, 16.2 of the first axis 12. The second clutch 72 is located in a torque path between the electric motor 18 and the wheels 16.3, 16.4 of the second axis 14. The clutches 77.1, 77.2 can preferably be switched electrically. In this way, it is possible for the electric vehicle 10 to have either a purely front-wheel drive, a purely rear-wheel drive or 4-wheel drive.

Figure 1D:
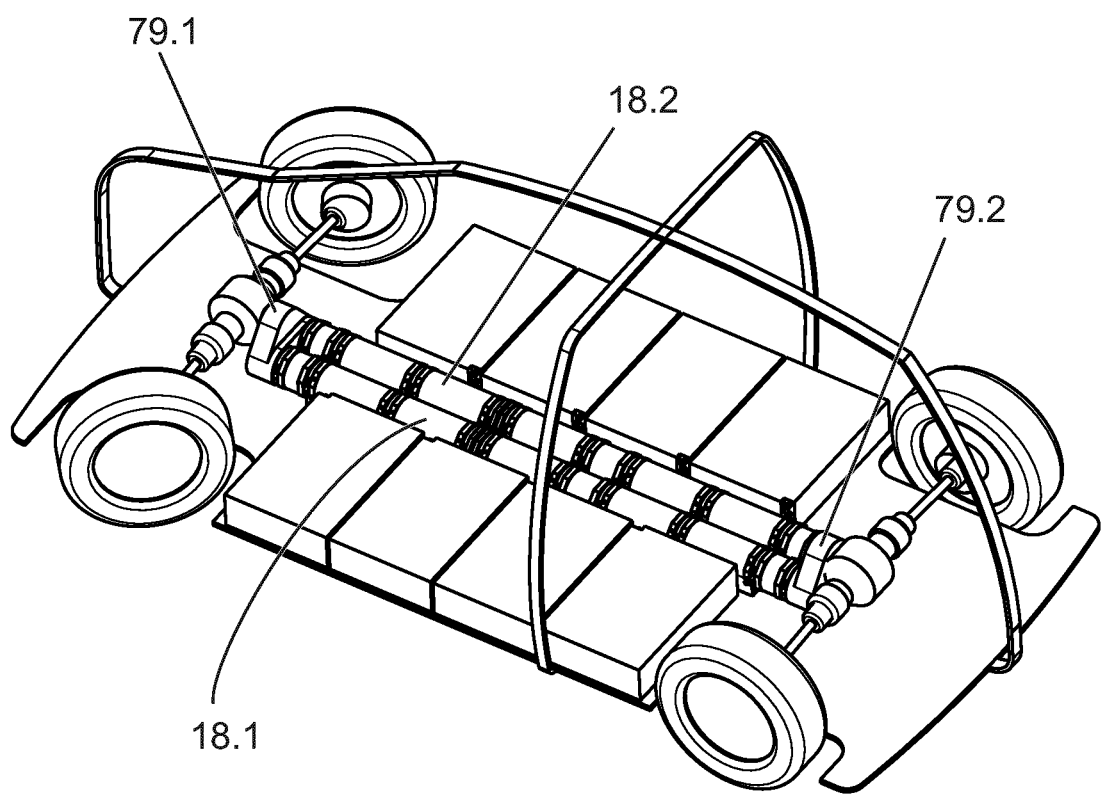

FIG. 1*d* depicts a reduced, perspective and scaled view of an electric vehicle according to the invention according to a further embodiment, which features two electric motors 18.1, 18.2. Both electric motors 18.1, 18.2 are composed of at least two modules, the rotational axes of which extend parallel to one another. However, this refers to parallelism in the technical sense, which is to say that it is possible but not essential for the two axes to extend parallel to one another in the mathematical sense. In particular, the rotational axes can form an angle with one another that is smaller than, for instance, 3°.

Figure 2A:
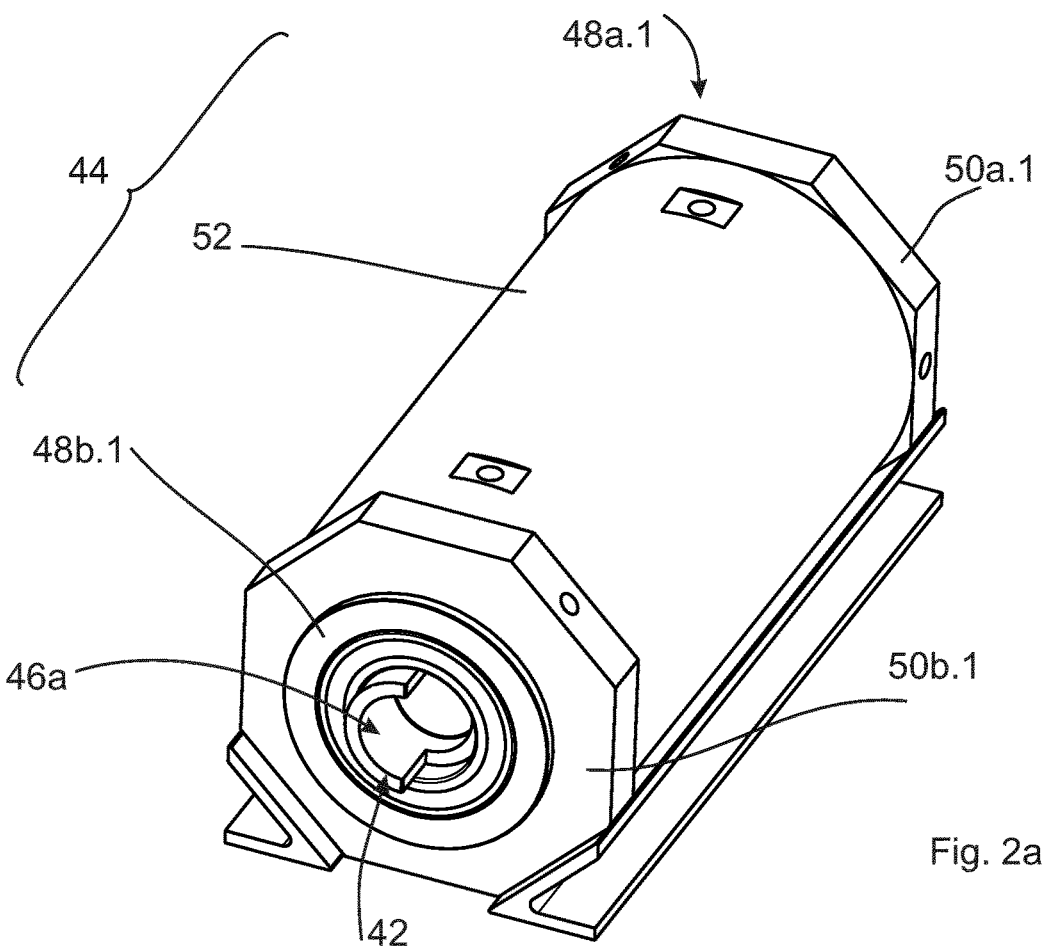

FIG. 2*a* shows an electric motor module 38 of the internal rotor version, which comprises a first rotor 42 (see FIG. 2*b*) and a module housing 44. A first coupling structure 46*a* is configured on the rotor shaft 40 of the rotor 42. The module housing 44 comprises a housing ring 48, which may also be described as a coupling ring. In the present case, the housing ring 48 is designed on a stator cap 50*a*. The module housing 44 also features a second stator cap 50*b* and a stator carrier 52, which is connected to both stator caps 50*a*, 50*b* and arranged between the two in the embodiment of the internal rotor version shown.

It should be recognised that the shaft coupling structure 46 partially protrudes axially beyond the module housing 44 and partially returns behind the module housing 44.

Figure 2B:
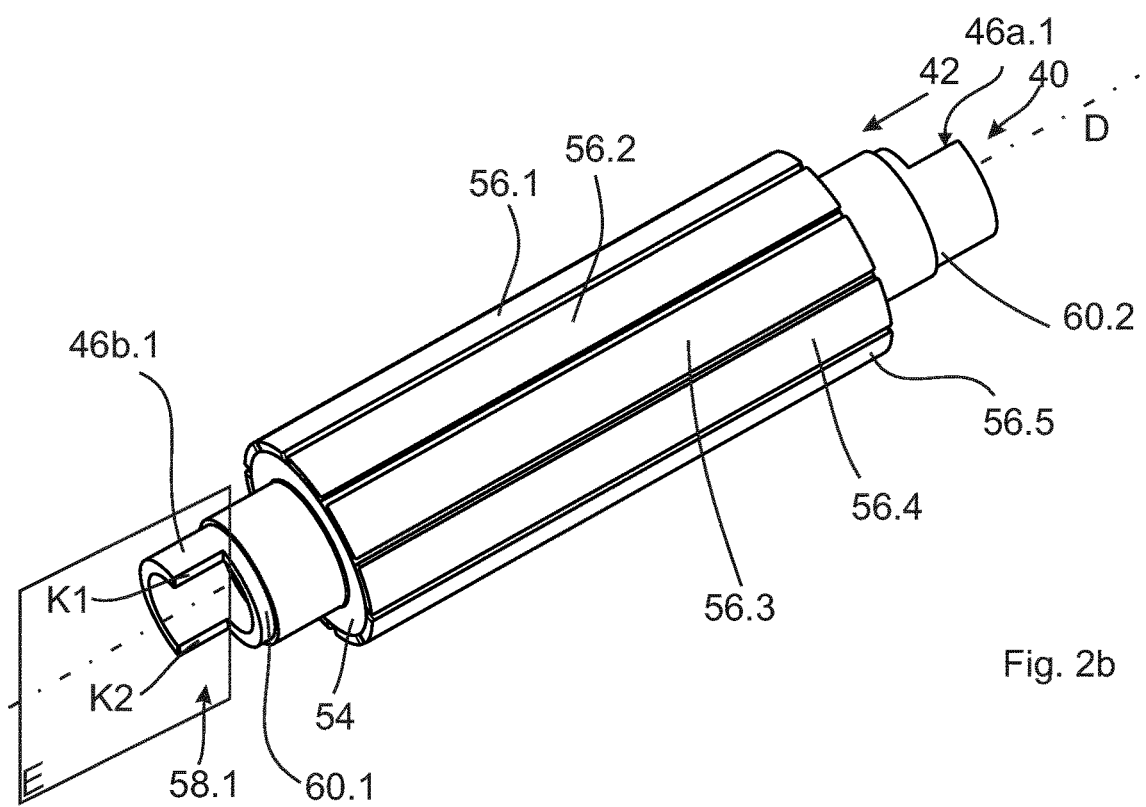

FIG. 2*b* depicts the rotor 42 with the shaft coupling structure 46*a*.1 and a second shaft coupling structure 46*b*.1, which is arranged opposite the first coupling structure 46*a*. The rotor 42 has a magnet carrier 54, by means of which permanent magnets 56.1, 56.2 are arranged. The permanent magnets 56.*j* (j=1, 2, . . . ) are arranged in such a way that the north pole and south pole point outwards on an alternating basis.

FIG. 2*b* also shows that the first coupling structure 46*a* has a projection 58.1 that extends in the axial direction. When mounted, this projection 58.1 lies along two contact surfaces K1, K2 on a complementary coupling structure of the adjacent electric motor module. In the present case, the contact surfaces K1, K2 form an angle of between 0° and 1° with an angle measurement plane E. The angle measurement plane E is the plane which contains a rotational axis D of the rotor 42 and touches or intersects the respective contact surface K at at least one point.

The rotor 42 also has a first bearing seating surface 60.1 and a second bearing seating surface 60.2.

Figure 3A:
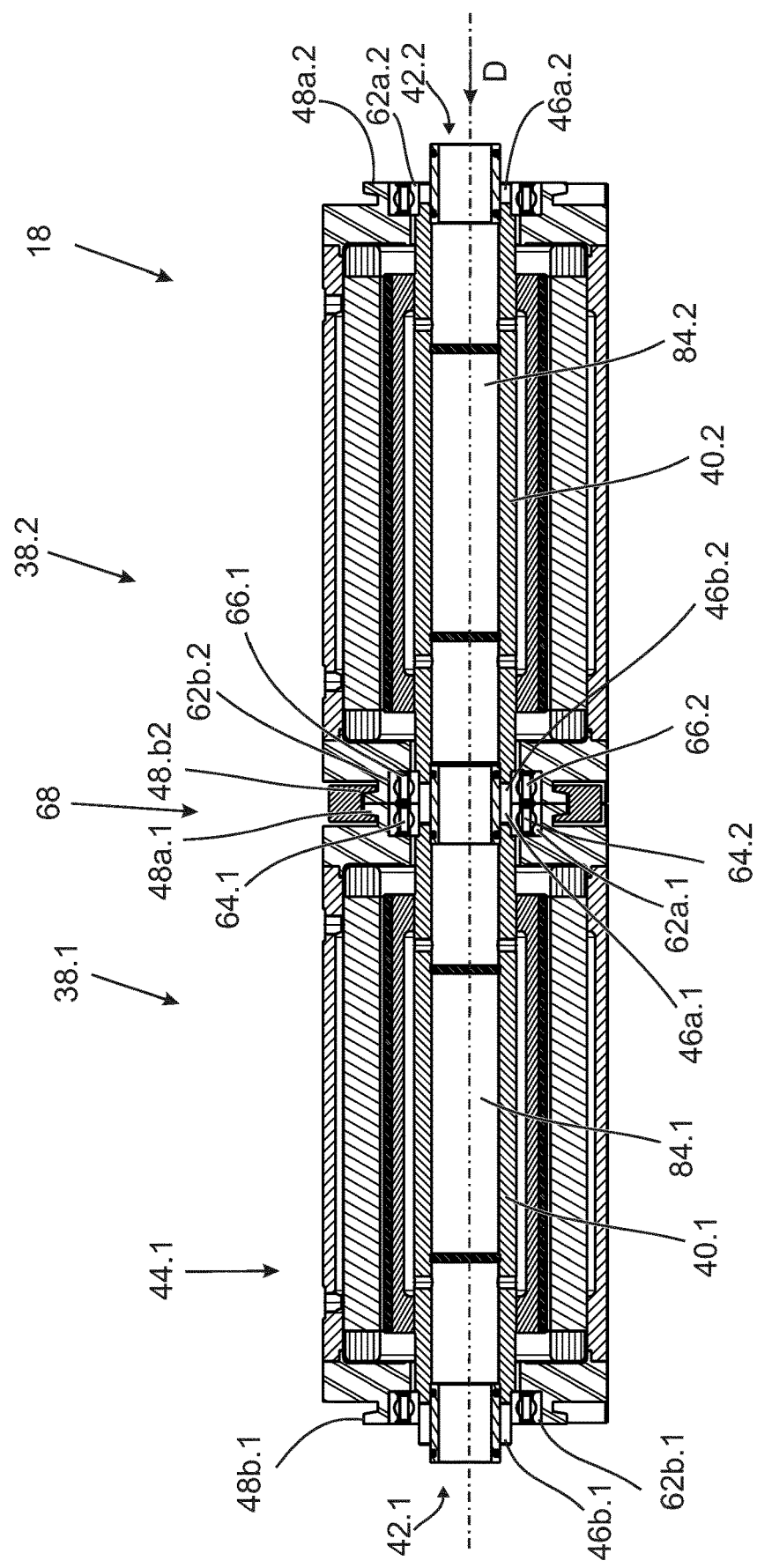

FIG. 3*a* shows a cross-section through an embodiment of an electric motor 18 according to the invention, composed of electric motor modules 38.1, 38.2, which are structurally identical.

The first electric motor module 38.1 has a first pivot bearing 62*a*.1 in the form of a ball bearing and a second pivot bearing 62*b*.1. The second electric motor module 38.2 has a pivot bearing 62*a*.2 and a second pivot bearing 62*b*.2. The first pivot bearing 62*a*.1 has a first set of rolling elements 64.1, 64.2, . . . , which are arranged annularly. The second pivot bearing 62*b*.2 also features rolling elements 66.1, 66.2, . . . , arranged along a second ring which is at an offset to the first ring. Both pivot bearings 62*a*.1 and 62*b*.2 form a pivot bearing 68. It should be recognised that the coupling structure 46*a* of the first electric motor module 38.1 forms a positive-locking fit with a coupling structure 46*b*.2 of the second electric motor module 38.2, and that the coupling structures 46*a*.1, 46*b*.2 are surrounded by the rotational bearing 68.

FIG. 3*a* shows that the coupling structure 46*a*.1 of the first electric motor module 38.1 extends to below the pivot bearing 62*b*.2 of the second electric motor module 38.2. Regardless of other properties of the embodiment described here, this represents a generally preferred embodiment. The coupling structure 46*b*.2 also extends to below the pivot bearing 62*a*.1.

If the present description contains a reference to an axial length, this refers to a position along a schematically depicted x-axis, which extends towards the rotational axis D. In particular, the coupling structures 46*a*.1 and 46*b*.2 are thus arranged at the same axial height as the rotational bearing 38.

Figure 3B:
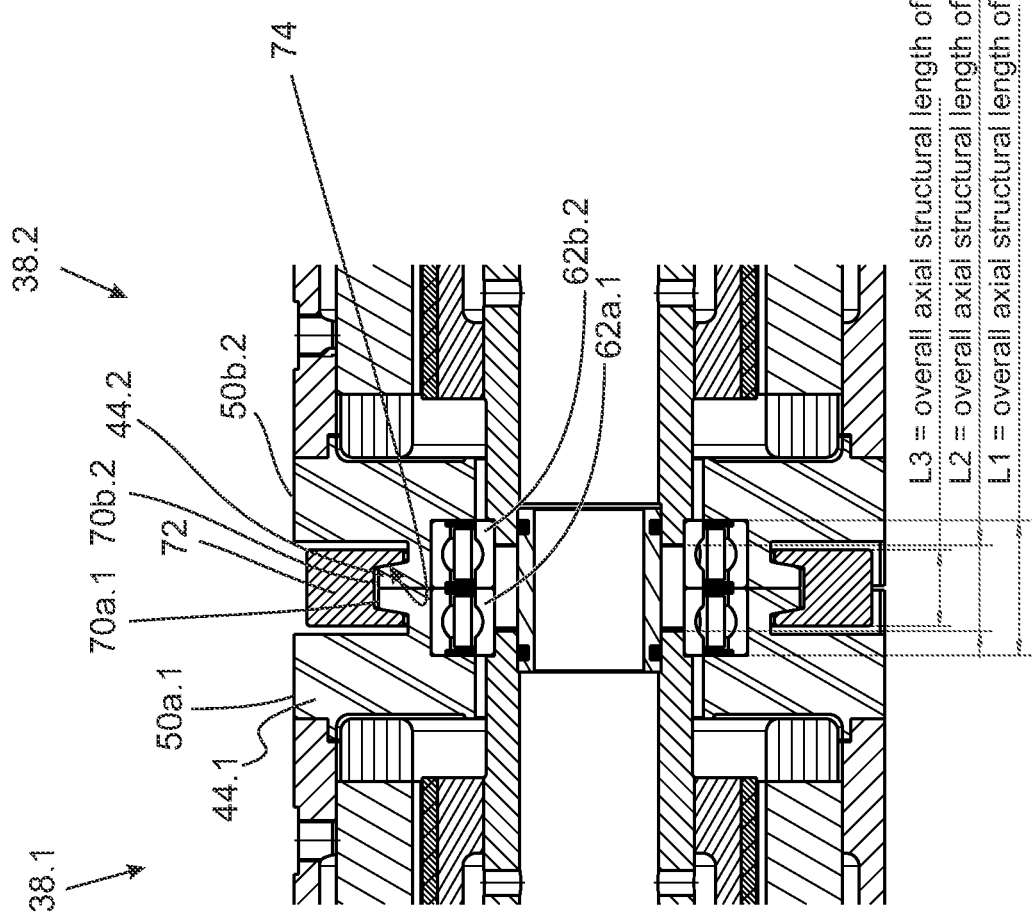

FIG. 3*b* depicts a section from FIG. 3*a*. It should be recognised that the module housing 44.1 has a first housing coupling structure 70*a*.1, which forms a first tapered housing ring. The second module housing 44.2 has a second housing coupling structure 70*b*.2, which also forms a second tapered housing ring. The two housing coupling structures 70*a*.1, 70*a*.2 are positively connected by means of a connector in the form of a coupling clamp 72. The coupling clamp 72 features a tapered inner surface 74, which has respective surface contacts with the housing coupling structures 70*a*.1, 70*b*.2, thereby effecting a positive-locking fit.

FIG. 3*b* also shows that an axial structural length L1 is less than twice the length, in this case less than 1.5-times the length, of an axial structural length L2 of a coupling section. The axial structural length L2 corresponds to the axial length of the shaft coupling. An axial structural length L3 of the coupling clamp 72 is slightly shorter than the axial length L2.

The coupling clamp 72 is designed in such a way that it can be released and tightened from the outside. It is therefore possible to connect two electric motor modules 38.1, 38.2 by first connecting the rotor shafts to one another by means of their respective shaft coupling structures. The housings are then connected to one another via the connector, i.e. the coupling clamp 72 in this case. To release the connection between the two electric motor modules 38.1, 38.2, the coupling clamp 72 must simply be removed; the rotor shafts can then be pulled apart axially.

FIG. 4*a* depicts an electric motor according to the invention, which comprises three electric motor modules 38.1, 38.2 and 38.3 as well as a rotary encoder 76, a clutch 77 and a brake 78. The rotary encoder 76 and the brake 78 each have a shaft, which extends coaxially to the rotor shafts of the electric motor modules 38.*i*.

FIG. 4b depicts a partial exploded view of the electric motor 18 according to FIG. 4a. It should be recognised that the rotary encoder 76 features rotary encoder coupling structures 80a, 80b, which correspond to the coupling structures 46 of the electric motor modules 38.

The brake 78 has at least one brake coupling structure 82a, which is designed like the other coupling structures, so that the brake 78 can be positively connected to both the rotary encoder 76 and each electric motor module 38. The coupling 77 has the same coupling structure as the brake 78, such that it can be coupled with each electric motor module, like the brake 78.

Figure 5:
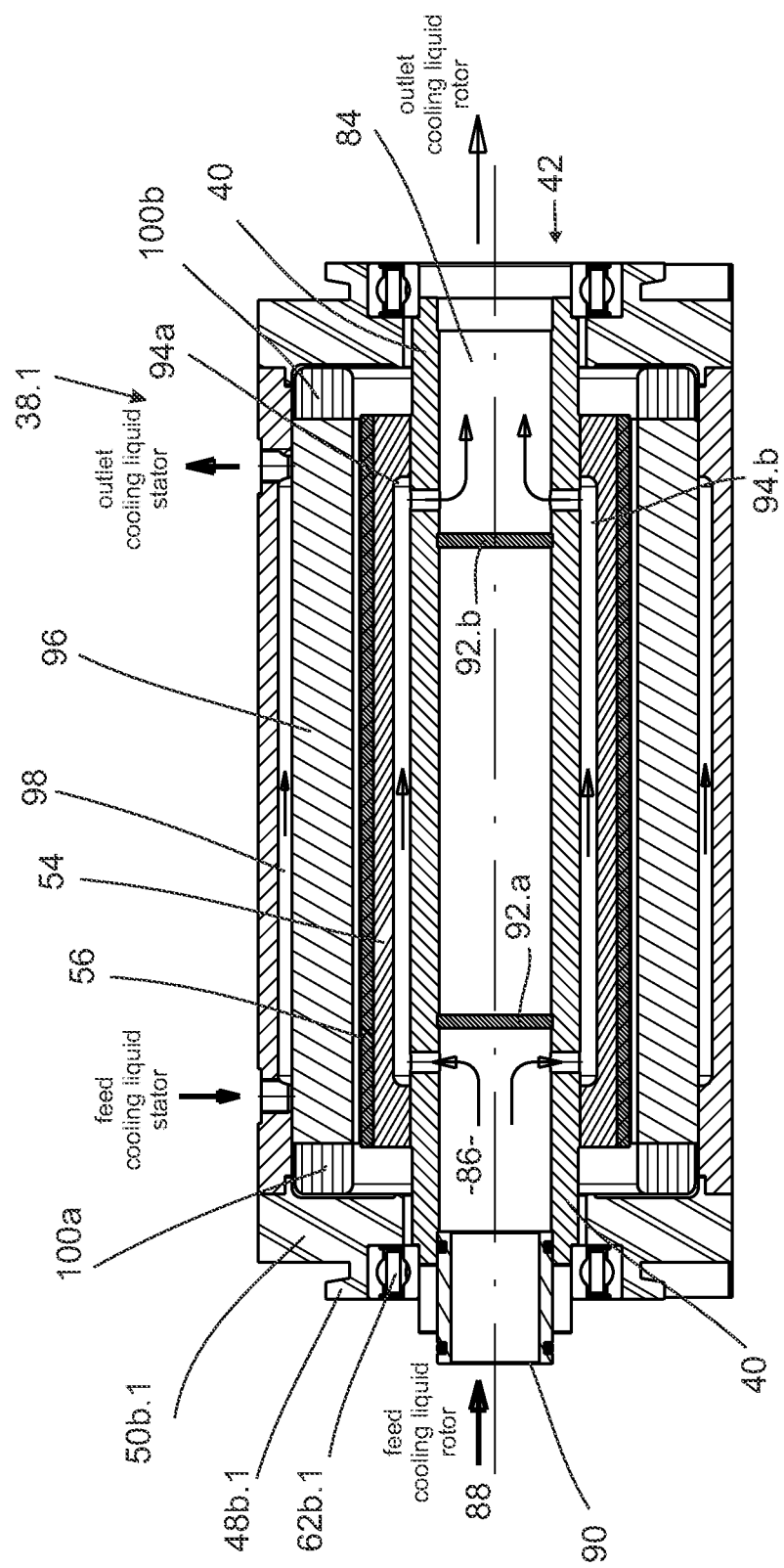

FIG. 5 depicts a cross-section through the electric motor module 38.1, which can also be considered as an independent electric motor. It should be recognised that a cooling duct 84 is arranged in the rotor shaft 40. In the present form, the cooling fluid 86 in the form of a liquid coolant is supplied through a cooling fluid feed 88. A sealing bush 90 rotates with the rotor shaft and is connected to the rotor shaft 40 via seals.

At least one, but preferably two, partition walls 92a, 92b are arranged in the rotor shaft 40 which cause the cooling fluid 86 to flow through a first secondary duct 94a, a second secondary duct 94b or another secondary duct, not depicted. The secondary ducts 94a, 94b, . . . extend in both the axial and radial direction, and thus largely parallel to the cooling duct 84. The cooling fluid in the secondary duct 94 cools the magnet carrier 54 and thus the permanent magnets 56.

A laminated stator core 96 is arranged radially outside the permanent magnets 56. The laminated stator core 96 is cooled in a stator cooling duct 98 using cooling fluid. It is possible that the stator cooling duct 98 does not extend across the full width of the laminated stator core, in particular winding heads 100a, 100b need not lie on an axial length on which the stator cooling duct 98 also extends.

Figure 6:
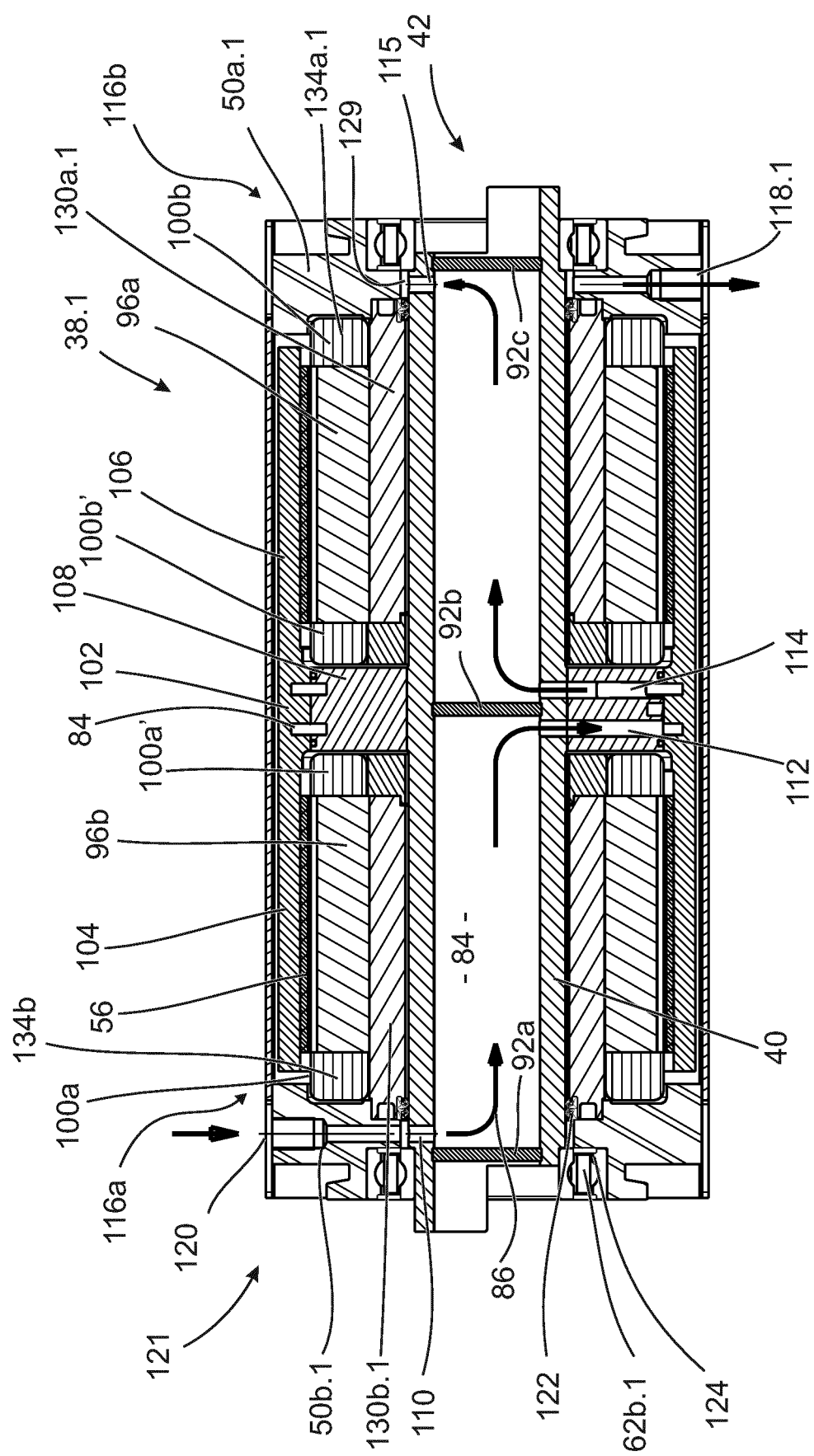

FIG. 6 shows a further embodiment of an electric motor module 38 according to the invention, which also represents an independent embodiment of an electric motor according to the invention. As the electric motor according to FIG. 5 is an internal rotor, the electric motor 38 according to FIG. 6 is an external rotor, where the permanent magnets 56 are arranged radially outside of the laminated stator core 96. The laminated stator cores 96a, 96b engage in a space between the rotor shaft 40 and a tubular component 102, which features a first sleeve section 104 and a second sleeve section 106. The tubular component 102 is fixed to a bar 108, which can also be described as a rotor hub. The tubular component 102 and the web 108 form a T-shaped rotor element.

The rotor shaft 40 features a feed branch duct 110, by means of which the cooling fluid 86 can be guided into the cooling duct 84. The partition walls 92a, 92b, 92c cause the cooling fluid from the branch duct 110 to first cover a part in the cooling duct 84 and then flow into a first web duct 112, from where it can flow into an unmarked duct in the tubular component 102. The cooling fluid heats up here and flows through a second web duct 114 in the web 108 back into the duct 84. Via a discharge branch duct 115, the cooling fluid flows out of the rotor 42 into a shaft annular duct 129 between the stator housing 121 and the rotor shaft 40, and from there into a cooling fluid discharge 118.

The cooling fluid 86 reaches the feed branch duct 110 via a cooling fluid feed 120, wherein the cooling fluid feed 120 is also configured in a stator housing 121; in the present case, it is configured in the stator cap 50b1. The cooling fluid feed 120 comprises a first shaft seal 122 and a second shaft seal 124. In the present embodiment, the second shaft seal 124 also serves to seal the pivot bearing 62b.1. However, the second shaft seal can of course also be arranged in another position.

Figure 7A:
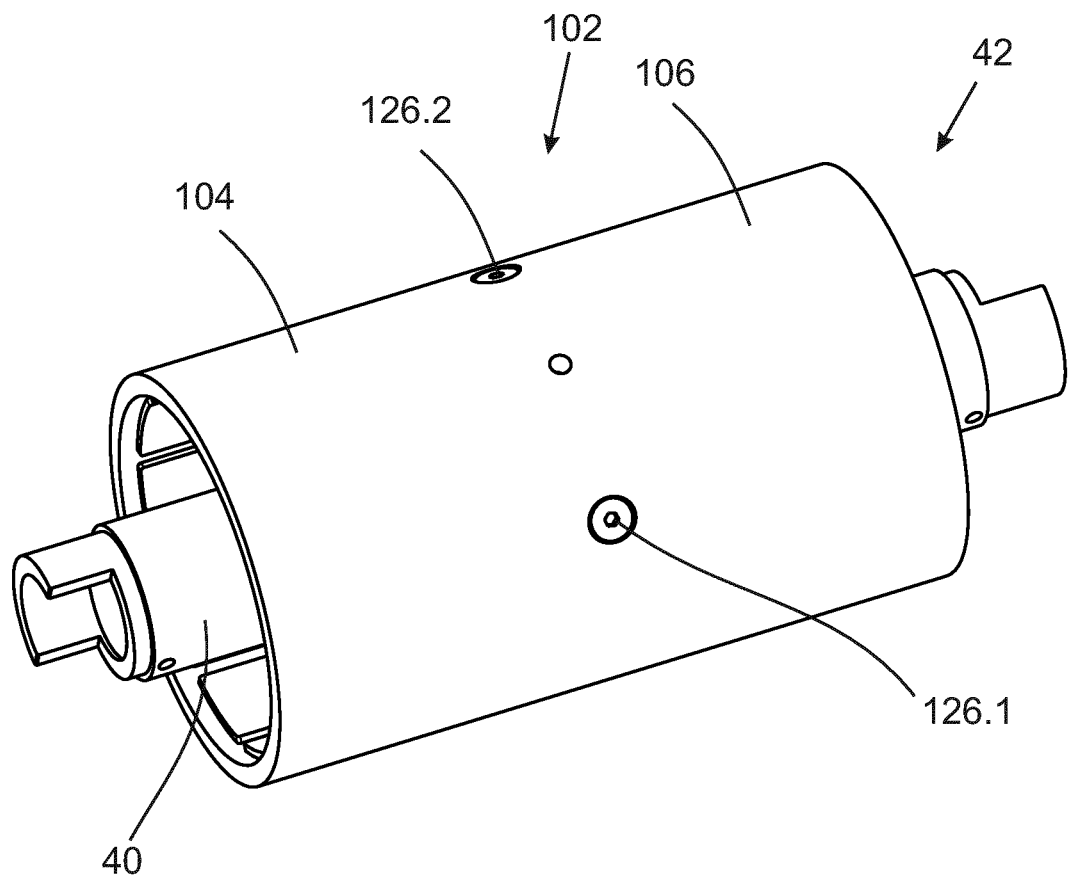

FIG. 7a shows an isometric view of the rotor 42 of the module 38.1. It should be recognised that the tubular component 102 is fixed to the web 108 via screws 126.1, 126.2 (see FIG. 7b).

Figure 7B:
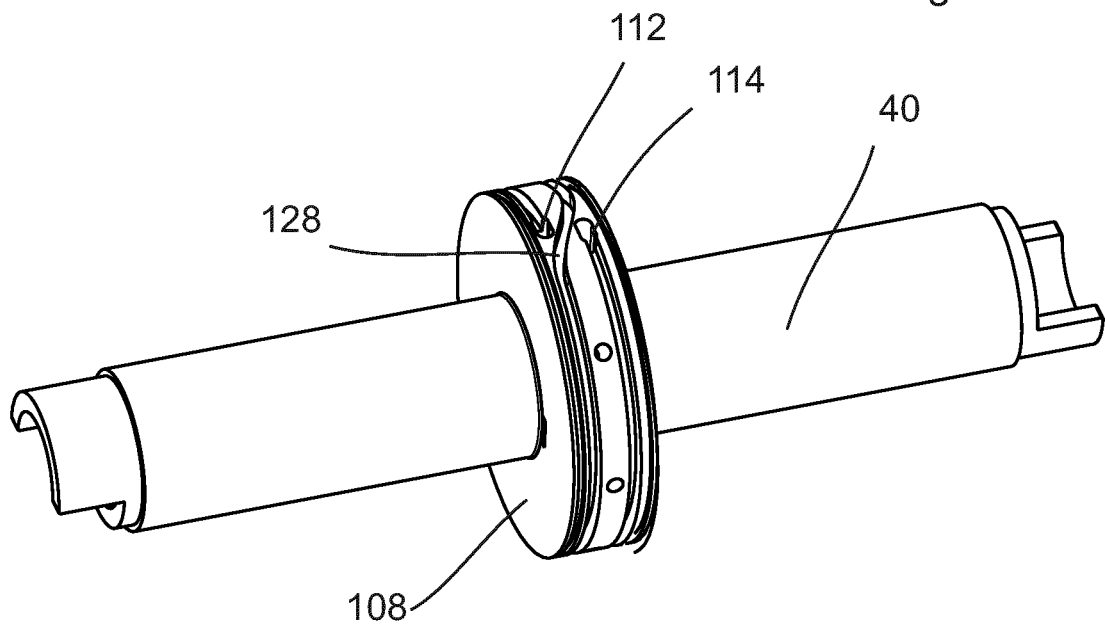

FIG. 7b depicts the web ducts 112, 114, between which a web annular duct 128 is arranged. Cooling fluid flows from the web annular duct 128 into the open component 102 and back, such that it ends up in the second web duct 114.

Figure 8:
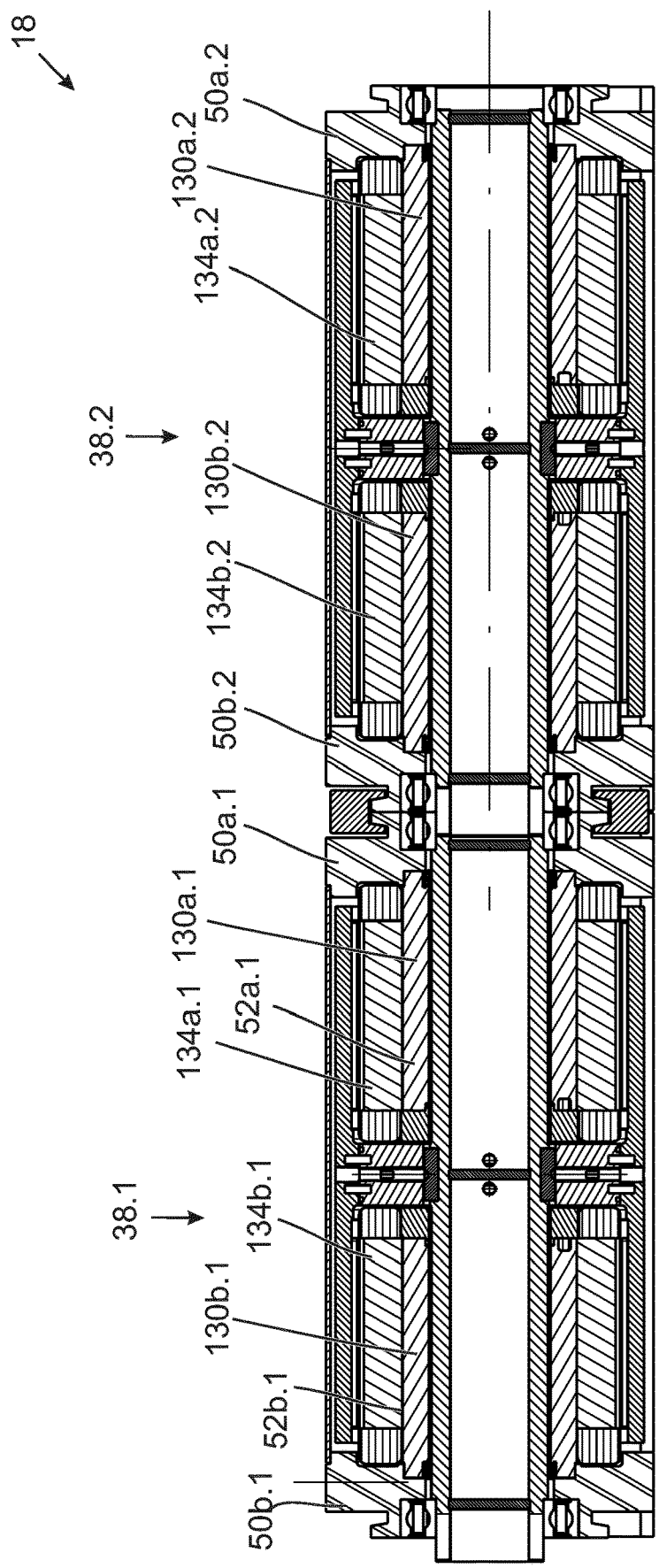

FIG. 8 depicts a cross-section through an electric motor 18 according to the invention, which is composed of two electric motor modules 38.1, 38.2 of the external rotor version.

Figure 9A:
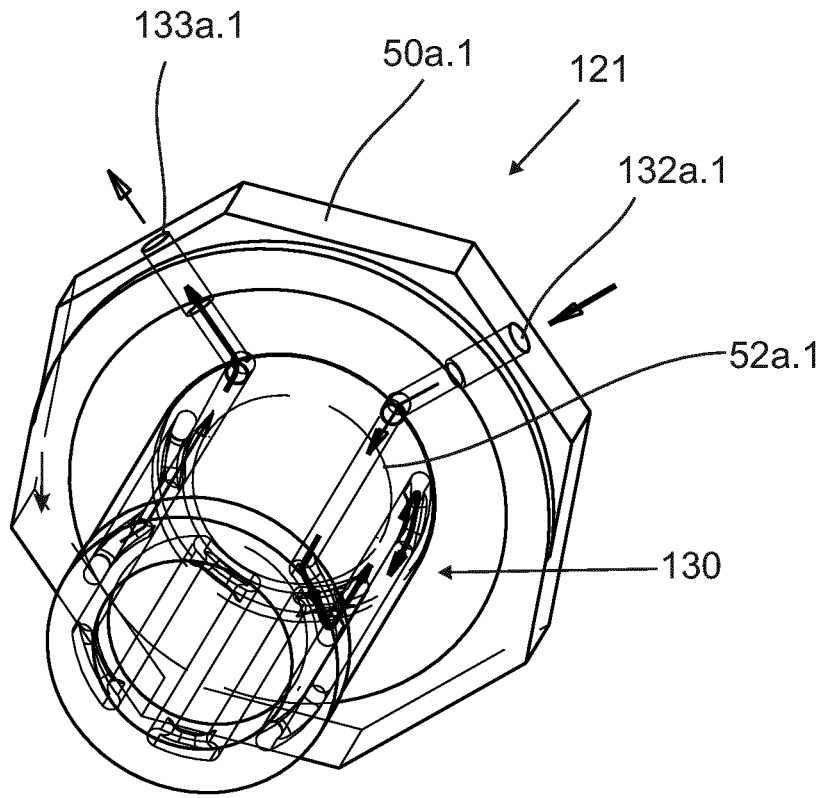

FIG. 9a shows a part of the stator housing 121, consisting of a stator cap 50 and stator carrier 52, which features an inflow 132 for cooling fluid and an outflow 133 for cooling fluid and which comprises a cooling nozzle 130. FIG. 9 also shows the cooling nozzles of the electric motor 18, which are labelled with the counting suffixes "a" and "b" as well as "1" and "2", as is also the case for other components of which there is more than one. The purpose of this counting system is to designate multiple objects as easily as possible as being of the same type. Stator electromagnets 134 (see FIGS. 7 and 9) of the electric motors, which are external rotors, are cooled via cooling nozzles 130.

Figure 9B:
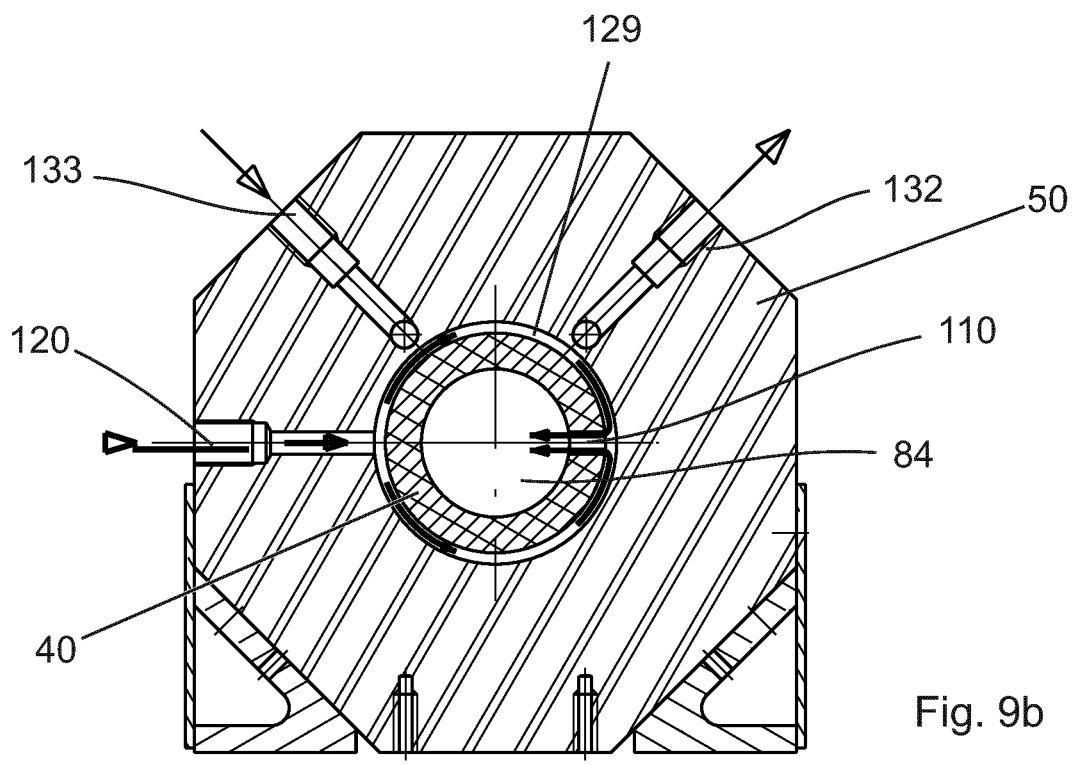

FIG. 9b depicts a cross-section through the stator cap 50 and the rotor shaft 40 to represent the shaft annular duct 129.

Figure 10:
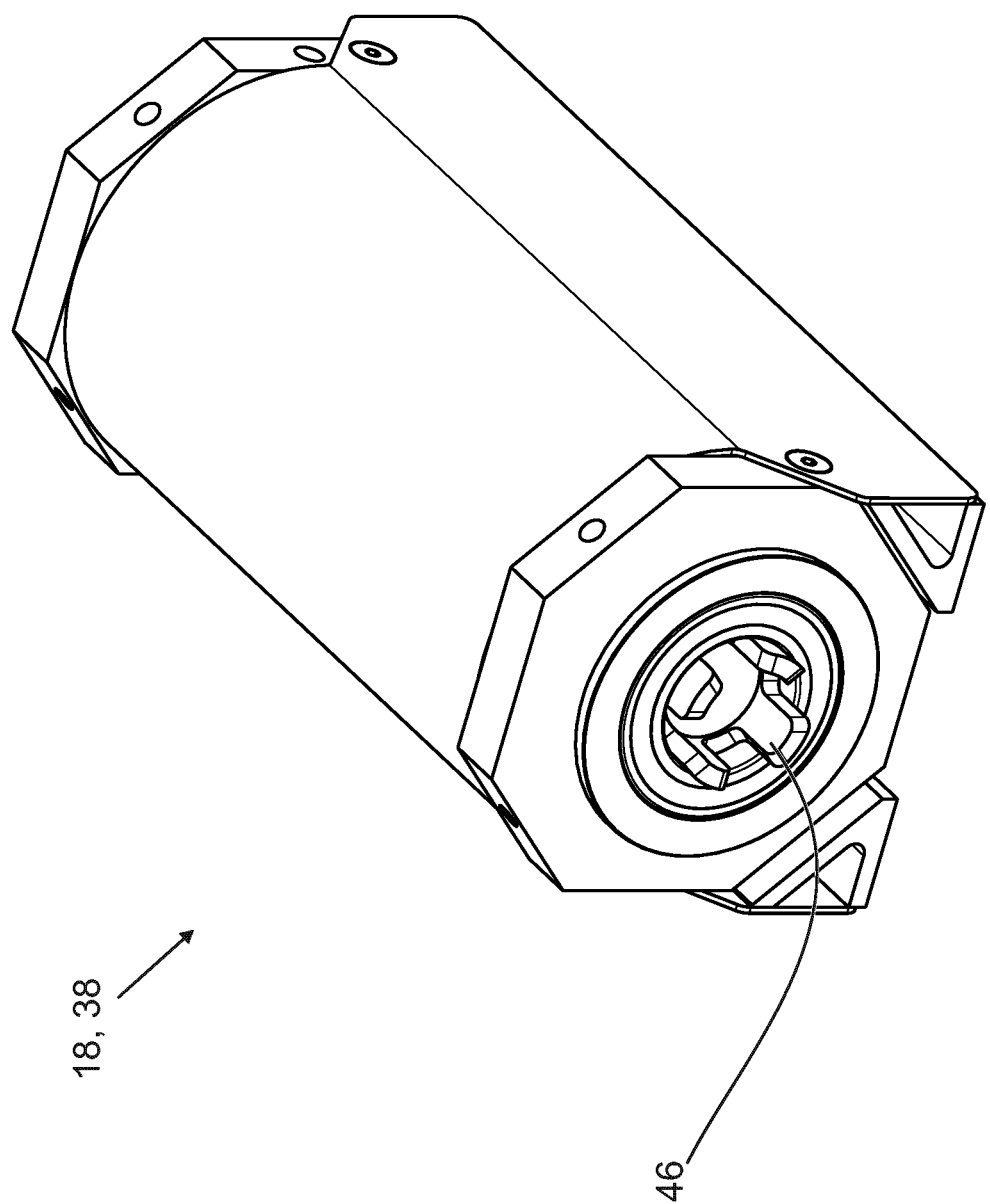

FIG. 10 shows a further embodiment of an electric motor module 38, the shaft coupling structure 46 of which is designed to have multiple teeth.

REFERENCE LIST

| | |
|---|---|
| 10 | electric vehicle |
| 12 | first axle |
| 14 | second axle |
| 16 | wheels |
| 18 | electric motor |
| 20 | differential |
| 22 | battery |
| 24 | battery unit |
| 26 | vehicle floor |
| 28 | body |
| 30 | driver's seat |
| 32 | front passenger's seat |
| 34 | base |
| 36 | passenger area |
| 38 | electric motor module |
| 40 | rotor shaft |
| 42 | rotor |
| 44 | module housing |
| 46 | shaft coupling structure |
| 48 | housing ring |
| 50 | stator cap |
| 52 | stator carrier |
| 54 | magnet carrier |
| 56 | permanent magnet |
| 58 | projection |
| 60 | bearing seating surfac |
| 62 | pivot bearing |
| 64 | rolling element |
| 66 | rolling element |
| 68 | rotational bearing |
| 70 | housing coupling structure |
| 72 | coupling clamp |
| 74 | inner surface |
| 76 | rotary encoder |
| 77 | clutch |
| 78 | brake |

-continued

| | |
|---|---|
| 79 | coupling mechanism |
| 80 | rotary encoder coupling structure |
| 81 | clutch coupling structure |
| 82 | brake coupling structure |
| 84 | cooling duct |
| 86 | cooling fluid |
| 88 | cooling fluid feed |
| 90 | sealing bush |
| 92 | partition wall |
| 94 | secondary duct |
| 96 | laminated stator core |
| 98 | stator cooling duct |
| 100 | winding head |
| 102 | tubular component |
| 104 | first sleeve section |
| 106 | second sleeve section |
| 108 | web |
| 110 | feed branch duct |
| 112 | web duct |
| 114 | second web duct |
| 115 | discharge branch duct |
| 116 | stator |
| 118 | cooling fluid discharge |
| 120 | cooling fluid feed |
| 121 | stator housing (composed of stator cap 50 and stator carrier 52) |
| 122 | first shaft seal |
| 124 | second shaft seal |
| 126 | screw |
| 128 | web annular duct |
| 129 | shaft annular duct |
| 130 | cooling nozzle |
| 132 | inflow |
| 133 | outflow |
| 134 | stator electromagnet |
| A | wheelbase |
| D | rotational axis |
| $D_{18}$ | motor rotational axis |
| E | angle measurement plane |
| i, j | running index |
| $K_i$ | contact surface |
| L1 | axial structural length of rotational bearing |
| L2 | axial structural length of shaft coupling structure |
| L3 | axial structural length of housing coupling structure |
| $m_l$ | left battery mass |
| $m_r$ | right battery mass |
| Q | central percentile |
| Q1, Q2 | cuboids |
| $S_{10}$ | vehicle mass centre of gravity |
| $S_{18}$ | electric motor mass centre of gravity |
| $S_{22}$ | battery mass centre of gravity |

The invention claimed is:

1. An electric vehicle with an electric motor wherein the electric motor comprises
a plurality of electric motor modules, comprising
a first electric motor module, comprising a first rotor which has a first rotor shaft, wherein the first rotor shaft has a first shaft coupling structure, and
at least a second electric motor module, comprising a second rotor which has a second rotor shaft, wherein the second rotor shaft has a second shaft coupling structure, and
a rotational bearing by which the first rotor shaft is mounted,
wherein the first rotor shaft and the second rotor shaft are positively coupled with one another via the first and second shaft coupling structures,
wherein the first and second shaft coupling structures are at least partially surrounded by the rotational bearing, and
wherein the first and second electric motor modules are capable of functioning independently of one another.

2. The electric vehicle according to claim 1, wherein at least two electric motor modules of the plurality of electric motor modules are structurally identical.

3. The electric vehicle according to claim 1, wherein at least two electric motor modules of the plurality of electric motor modules are synchronous motors.

4. The electric vehicle according to claim 1, wherein
the first shaft coupling structure comprises a projection that extends in an axial direction,
the second shaft coupling structure has a recess that extends in the axial direction; so that the first shaft coupling structure and the second shaft coupling structure abut one another in the axial direction along a contact surface, and
the contact surface forms an angle of at most 5° with an angle measurement plane which contains a rotational axis of the first or second rotor.

5. An electric vehicle with an electric motor wherein the electric motor comprises
a plurality of electric motor modules, comprising
a first electric motor module, comprising a first rotor which has a first rotor shaft, wherein the first rotor shaft has a first shaft coupling structure, and
at least a second electric motor module, comprising a second rotor which has a second rotor shaft, wherein the second rotor shaft has a second shaft coupling structure, and
a rotational bearing by which the first rotor shaft is mounted,
wherein the first rotor shaft and the second rotor shaft are positively coupled with one another via the first and second shaft coupling structures, and
wherein
the rotational bearing comprises a first pivot bearing which comprises a first set of rolling elements arranged annularly, and
the rotational bearing comprises a second pivot bearing which comprises a second set of rolling elements that are arranged annularly and at an offset to the first set of rolling elements, and
the first and second shaft coupling structures are at least partially surrounded by the first pivot bearing and the second pivot bearing.

6. An electric vehicle with an electric motor wherein the electric motor comprises
a plurality of electric motor modules, comprising
a first electric motor module, comprising a first rotor which has a first rotor shaft, wherein the first rotor shaft has a first shaft coupling structure, and
at least a second electric motor module, comprising a second rotor which has a second rotor shaft, wherein the second rotor shaft has a second shaft coupling structure, and
a rotational bearing by which the first rotor shaft is mounted,
wherein the first rotor shaft and the second rotor shaft are positively coupled with one another via the first and second shaft coupling structures, and
wherein
the electric motor further comprises a rotary encoder which comprises a rotary encoder coupling structure with a projection that extends in an axial direction, and
the rotary encoder is positively connected to either the first or second shaft coupling structure of an electric motor module.

7. The electric vehicle according to claim 6, wherein
the electric motor has a brake which comprises a brake coupling structure with a projection that extends in an axial direction, and
the brake is positively connected to the first or second shaft coupling structure of an electric motor module or the rotary encoder.

8. The electric vehicle of claim 6, wherein the first and second shaft coupling structures are at least partially surrounded by the rotational bearing.

9. An electric vehicle with an electric motor wherein the electric motor comprises
a first electric motor module comprising
a first rotor which has a first rotor shaft, and
a rotational bearing by which the first rotor shaft is mounted, and
wherein the first rotor shaft has a first shaft coupling structure, and
at least a second electric motor module, comprising a second rotor which has a second rotor shaft, wherein the second rotor shaft has a second shaft coupling structure,
wherein the first rotor shaft and the second rotor shaft are positively coupled with one another via the first and second shaft coupling structures,
wherein the first and second shaft coupling structures are at least partially surrounded by the rotational bearing,
wherein the first rotor shaft and the second rotor shaft have a cooling duct, and
wherein the cooling duct extends through the first rotor and the second rotor.

10. An electric vehicle with an electric motor wherein the electric motor comprises
a plurality of electric motor modules, comprising
a first electric motor module, comprising a first rotor which has a first rotor shaft, wherein the first rotor shaft has a first shaft coupling structure, and
at least a second electric motor module, comprising a second rotor which has a second rotor shaft, wherein the second rotor shaft has a second shaft coupling structure, and
a rotational bearing by which the first rotor shaft is mounted,
wherein the first rotor shaft and the second rotor shaft are positively coupled with one another via the first and second shaft coupling structures, and
a stator,
wherein at least one of the first rotor shaft and the second rotor shaft comprises
a central cooling duct that extends in an axial direction,
a feed branch duct that extends radially outwards and is connected to the central cooling duct, and
a discharge branch duct that extends outwards and is connected to the central cooling duct, and
wherein the stator comprises
a cooling fluid feed for supplying cooling fluid to the feed branch duct, and
a cooling fluid discharge for discharging cooling fluid from the discharge branch duct.

11. The electric vehicle according to claim 10, wherein the cooling fluid feed has
a first shaft seal and a second shaft seal which form a shaft annular duct, and
a feed line that is configured to feed cooling fluid to the annular duct.

12. The electric vehicle according to claim 10, wherein the first rotor comprises
a magnet carrier,
a plurality of permanent magnets fixed to the magnet carrier, and
a secondary duct which extends in the axial direction through the magnet carrier and is connected to the central cooling duct.

13. The electric vehicle according to claim 12, wherein
the stator comprises stator electromagnets,
the permanent magnets of the first rotor are arranged radially outside of the stator electromagnets,
the rotor shaft has
a first sleeve section that extends in a first axial direction and
a second sleeve section that extends in a direction opposite to the first axial direction,
the first and second sleeve sections are symmetrical, and
the first and second sleeve sections contain cooling ducts.

14. The electric vehicle according to claim 13, wherein
the first and second sleeve sections are configured on a tubular component,
the tubular component is fixed to a web, and
the web has a connection duct that extends radially outwards which connects the central cooling duct to an external duct in the tubular component.

15. The electric vehicle according to claim 10, wherein the cooling fluid is coolant.

16. The electric vehicle of claim 10, wherein the first and second shaft coupling structures are at least partially surrounded by the rotational bearing.

17. An electric vehicle with an electric motor wherein the electric motor comprises
a first electric motor module comprising a first rotor which has a first rotor shaft that comprises a first shaft coupling structure and a first cooling duct, and
at least a second electric motor module, comprising a second rotor which has a second rotor shaft that comprises a second shaft coupling structure and a second cooling duct,
wherein the first rotor shaft and the second rotor shaft are positively coupled with one another via the first and second shaft coupling structures, and
wherein the first and second cooling ducts are connected to one another.

18. The electric vehicle according to claim 17, wherein
the first electric motor module has a first module housing comprising a first housing coupling structure,
the second electric motor module has a second module housing comprising a second housing coupling structure,
the first and second electric motor modules are positively connected to one another via the first and second housing coupling structures, and
the first and second housing coupling structures radially surrounds the first pivot bearing.

19. The electric vehicle according to claim 18, wherein
the first housing coupling structure is at least partially formed by a first tapered housing ring,
the second housing coupling structure is at least partially formed by a second tapered housing ring, and
the first and second tapered housing rings are connected via a coupling clamp which has an at least partially tapered inner surface.

* * * * *